March 29, 1966    H. M. CRAWFORD    3,242,650
ADSORPTION APPARATUS
Filed Sept. 30, 1963
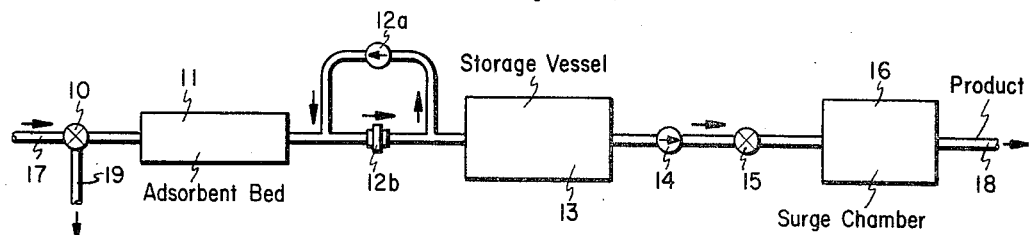
FIGURE 1
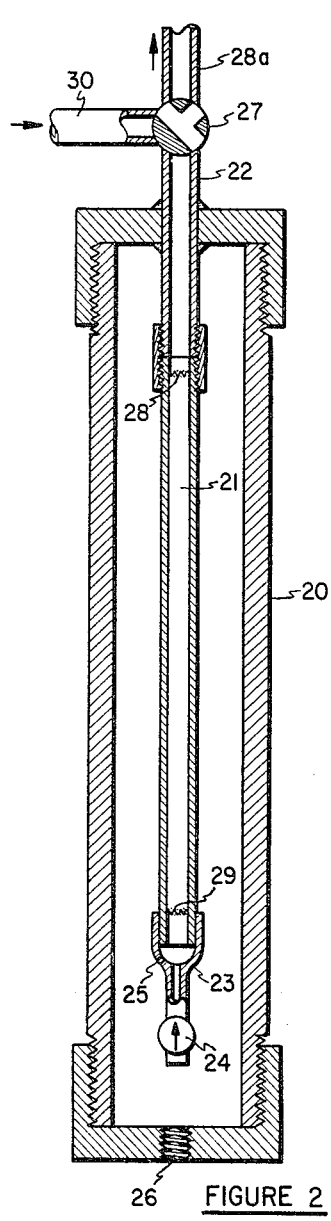
FIGURE 2
FIGURE 2a
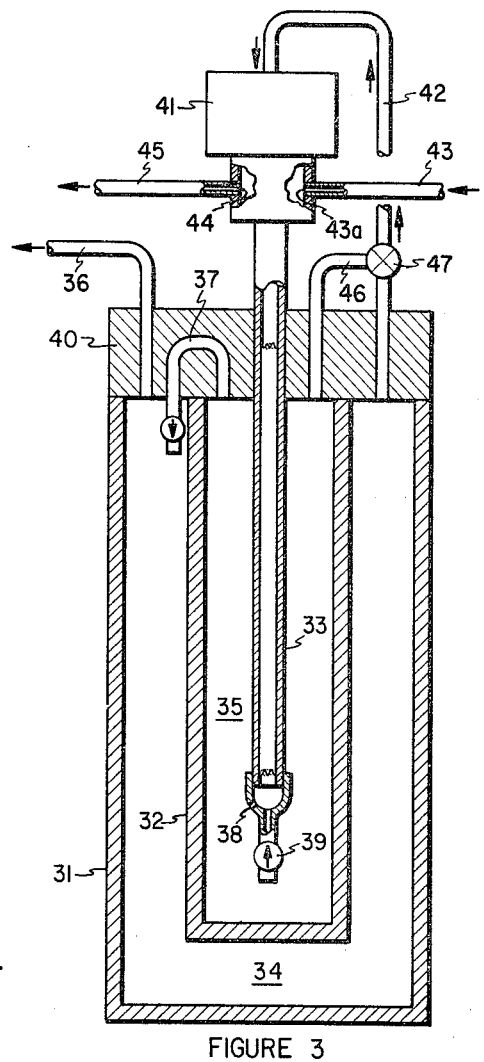
FIGURE 3
HARRY M. CRAWFORD    Inventor
By David A. Roth
Patent Attorney United States Patent Office 3,242,650
Patented Mar. 29, 1966

3,242,650
ADSORPTION APPARATUS
Harry M. Crawford, Port Murray, N.J., assignor to Esso Research and Engineering Company, a corporation of Delaware
Filed Sept. 30, 1963, Ser. No. 312,479
10 Claims. (Cl. 55—163)

This invention relates to an apparatus for adsorption and to processes utilizing such apparatus. In particular, the invention relates to an apparatus suitable for use for adsorbing various components from a fluid feed stream where the adsorbent is regenerated without application of exterior heat. With even greater particularity, the invention relates to a self-contained, self-generating, adsorption apparatus requiring no heat for said regeneration and the process which utilizes said apparatus.

Since U.S. Patent 2,944,627, issued to Dr. C. W. Skarstrom, the concept and use of heatless adsorption is becoming increasingly well known throughout industry. U.S. Patent 2,944,627 teaches that an adsorbent, after substantial saturation with one or more components may be desorbed by reducing the partial pressure of that component in the atmosphere surrounding the adsorbent. This patent also teaches that such desorptions by partial pressure reduction can be made more efficient when the heat of adsorption is not allowed to dissipate throughout an adsorption bed but is available to contribute toward the desorption partial pressure effect.

Thus, in general, "heatless adsorption" can be described as a process utilizing a solid adsorbent and a fluid feed to effect separations, such process involving a continuous, cyclic operation without application of external heat for regeneration of the adsorbent. This "heatless" aspect is attained by using the generated heat of adsorption as the thermal driving force in the regeneration step. Removal of adsorbed gas from the adsorbent bed during regeneration is achieved by lowering pressure and sweeping the adsorbent with a purge stream of product.

The use of two adsorbent vessels, one being on adsorption the other being on description, finds widespread use in commercial applications. In U.S. Patent 2,955,673 and commonly assigned U.S. Patent 3,182,435, issued May 11, 1965 in the name of Robert C. Axt, the concept of using a single adsorbent vessel is set forth. The invention herein sets forth new and improved adsorption apparatus using only one adsorbent vessel and new and improved methods of operating said single-vessel apparatus. In one aspect of the invention the apparatus comprises a three-way valve, an adsorbent vessel, an unrestricted desorbing flow means, a restricted adsorbing flow means, and a storage vessel. The full-flow desorbing means is designed so that flow during desorption is relatively unrestricted. Unrestricted desorbing flow means is defined as permitting a greater volumetric flow per unit of time than the restricted flow means. Usually this is accomplished by constructing the adsorbing flow means so it has a smaller cross sectional area than the desorbing flow means.

In another aspect of the invention the adsorbent vessel is located within a storage vessel and product for desorption is obtained from the storage vessel.

The invention can be fully understood by referring to both the preceding and the following descriptions, the claims taken in conjunction therewith and by the accompanying drawings wherein:

FIGURE 1 is a schematic diagram of one aspect of the apparatus of the invention.

FIGURE 2 is a cross sectional view of another aspect of the invention featuring an adsorbent vessel mounted within a storage vessel.

FIGURE 3 is a cross sectional view of an alternate embodiment of the apparatus of the invention showing the utilization of an automatic pneumatic control valve.

Referring now to FIGURE 1, there is shown in combination three-way valve 10, adsorbent vessel 11, check valve 12a and orifice 12b, storage vessel 13, check valve 14, needle valve 15, and surge chamber 16.

In operation, fluid is flowed into line 17 through three-way valve 10 and into sorbent vessel 11. These unadsorbed components pass through orifice 12b into storage vessel 13. From storage vessel 13 unadsorbed components, which are the product in this process, flow through check valve 14 into needle valve 15 and out through valve 18 as product.

Surge chamber 16 which is optional is provided between needle valve 15 and product line 18 if it is desired to even out any fluctuations in product rate.

In the desorption step, three-way valve 10 is turned, either manually or automatically, to vent the three-way valve to a lower pressure. The product in storage vessel 13 exits from storage vessel 13 and passes through check valve 12a and orifice 12b into vessel 11 which is at a low desorption pressure causing adsorbed impurities to be back washed through three-way valve 10 and out through vent line 19.

Although the above-described apparatus and process is especially adaptable for drying fluids, particularly gases, by removing water therefrom, it can be used widely for removing various constituents from a wide variety of fluids. The adsorbent or sorbent within the adsorbent vessel can be selected depending on the properties of the material to be removed. Orifice 12b is an embodiment of a restricted flow means while check valve 12a is an embodiment of an unrestricted flow means.

Referring now to FIGURE 2, a unique, heatless adsorber, single-vessel apparatus is shown. In this apparatus casing 20 is a storage vessel. Mounted within casing 20 is adsorbent bed 21. Adsorbent bed 21 is connected to a feed line through conduit 22 which is rigidly mounted in and extends through a top portion of storage vessel 20. On the bottom portion of adsorbent vessel 21 is mounted flow control means 23. Flow control means 23 is provided with check valve 24 and orifice 25. Check valve 24 is an unrestricted desorption flow means while orifice 25 is a restricted adsorption flow means. Product is removed from storage vessel 20 through conduit 26. Flow control means 23 has an annular, flanged bottom portion and has an annular, smaller tubular portion within which is mounted check valve 24. The exact shape of flow control means 23 is not important. It is preferred that it have a tubular bottom portion. However, as long as it provides for a greater volumetric flow per unit of time on desorption cycle than adsorption cycle, its shape is relatively unimportant.

Alternatively flow control means 23 can be provided with a long capillary tube as its bottom portion in which the check valve and orifice are omitted. The length and diameter of the capillary can be varied to adjust the rates of flow. A version of such a flow control means having a capillary is shown in FIGURE 2A.

In operation, conduit 22 is provided with a valve preferably a three-way valve. This valve can be a solenoid-type valve or it can be controlled pneumatically. The valve is shown in the drawing schematically as item 27.

In operation, adsorbent vessel 21 is packed with a suitable adsorbent. Screens 28 and 29 are provided within adsorbent vessel 21 to prevent movement and attrition of the adsorbent. The fluid which is to be treated by the adsorbent is flowed under adsorption pressure through line 30 into three-way valve 27 then through conduit 22 and into adsorbent vessel 21. Unadsorbed constituents of the fluid pass through adsorbent vessel 21 through orifice 25 and into the interior of storage vessel 20. This unabsorbed fluid is normally the desired product and is withdrawn through orifice 26 which can be provided with any desired conduit.

On the desorption phase of the cycle, valve 27 is actuated and adsorbent vessel 21 is vented to a lower pressure than the feed pressure. If the feed pressure is greater than atmospheric then the venting pressure can be atmospheric. It is also possible to use only a slightly greater than atmospheric adsorption pressure and utilize a vacuum for desorption. For adsorption of water from air it has been found that very good results are obtained by adsorbing at 60 p.s.i.g. and desorbing at atmospheric pressure. At any rate when conduit 22 and subsequent adsorbent vessel 21 are vented to a lower pressure, product stored within vessel 20 suddenly sweeps into check valve 24 and orifice 25 and passes in reverse flow through adsorbent vessel 21, through conduit 22, valve 27, and out through line 28a.

The desorption step is generally of a much smaller time duration than the adsorption step. Usually desorption is so fast that it is referred to as "explosive decompression." Although the time of desorption can match the time of adsorption it is generally preferred that the desorption time is anywhere from $\frac{1}{100}$ to $\frac{1}{2}$, preferably $\frac{1}{50}$ to $\frac{3}{10}$, and most preferably, $\frac{1}{40}$ to $\frac{1}{60}$ of the adsorption time.

In FIGURE 3 an alternate embodiment of the apparatus of the invention is illustrated. In FIGURE 3 the apparatus comprises an exterior casing 31 within which is located storage vessel 32 and within storage vessel 32 is located adsorbent vessel 33. The casing 31, storage vessel 32, and adsorbent vessel 33 are substantially annular in shape and are arranged in a concentric relationship with each other. The space between casing 31 and storage vessel 32 is utilized as a surge chamber and is designated as 34. The space between storage vessel 32 and the exterior of adsorbent vessel 33 is designated as storage space 35. Product is withdrawn from surge space 34 through conduit 36. Storage space 35 and surge space 34 are connected by means of conduit 37. Adsorbent vessel 33 is provided near its lower end with orifice 38 and check valve 39. Check valve 39 permits flow only on a desorption step and is substantially similar to check valve 24 of FIGURE 2. Casing 31 is provided with a cover means 40. Within cover means 40 are various apertures which permit the installation of conduits 36, 37, 42, 46 and adsorbent vessel 33 in the cover means 40 of casing 31. Attached to a portion of adsorbent vessel 33 is pressure responsive valve 41.

A preferred valve 41 for use on this apparatus is the model CDM–2501 single diaphragm, pressure switch, snap acting supplied by Instruments, Inc., Box 556, Tulsa, Oklahoma. The diaphragm actuates a three-way valve. In general, the CDM–2501 valve operates in the following manner. Conduit 42 which is connected with surge chamber 34 is connected to the top of valve 41 to provide means of conveying pressure to a diaphragm (not shown) located within valve 41. When this pressure exceeds a certain limiting amount, the diaphragm is forced to move in a downward direction. This movement actuates the three-way micro valve. Upon actuation, the gas flow into valve 41 through conduit 43 and into adsorbent vessel 33 is interrupted and the stored gas in storage vessel space 35 is vented through normally closed port 44 and conduit 45 to the atmosphere. With the lowering of pressure within vessel 33, some adsorbed constituents are removed through conduit 45. This stored product gas within storage tank 32 passes through check valve 39, orifice 38, and very rapidly passes completely through adsorbent vessel 33 and out through port 44 and vent conduit 45. This removes the rest of the adsorbed constituents. The pressure is now lowered within storage vessel 32. As product is removed through conduit 36, the pressure on the diaphragm which is exerted through conduit 42 is lowered and the feed under pressure in conduit 43 is allowed to pass through normally open port 43a in valve 41 and through adsorbent vessel 33 for further adsorption.

Instead of being connected to surge chamber 34 through conduit 42, valve 41 can alternatively be connected to storage tank space 35 through conduits 42 and 46 and valve 47. CDM–2501 valve 41 is preferably provided with a spring return permitting the valve 41 to resume its original position when pressure is removed from the diaphragm.

Thus, the apparatus of FIGURE 3 is a self-contained, self-regenerating, adsorbent apparatus which is extremely compact and which is activated by its own pneumatic impulses. Valve model CDM–2501 is designed to operate at a minimum pressure of 15 p.s.i. and a maximum pressure of 100 p.s.i. In practice with the apparatus as illustrated, the normally open port will be open when the pressure within surge chamber 34 is at a pressure of less than about 11 p.s.i.g. When the surge chamber 34 pressure or chamber 35 pressure reaches about 17 p.s.i.g. or above, the pressure transmitted through conduit 42 will depress the diaphragm. The diaphragm actuates the valve and normally closed port 44 is open and normally open port 43a is closed, thus initiating the desorption step.

The invention is additionally demonstrated in the following example.

*Example*

In this example the apparatus of FIGURE 3 was employed under the following conditions. The sorbent bed inside vessel 33 was packed with 20 cc. of ion exchange resin known as "Dowex" 50WX8 sodium form. Initial conditions were wet, i.e., the sorbent bed inside vessel 33 and chambers 34 and 35 had moisture contents in excess of 10,000 p.p.m. by volume. Air having a relative humidity of 100%, i.e., 7330 p.p.m. by volume of water at a temperature of 78° F. was introduced into the apparatus through conduit 43 at a rate of 6 s.c.f.h. and at a pressure of 50 p.s.i.g. Product was withdrawn from conduit 36 at a rate of 4 s.c.f.h. and at a pressure of 17 p.s.i.g. The process was operated continuously for a period of 17.9 hours. The self-actuated cycle time was 10 sec. for adsorption and less than 1 sec. desorption. The product from conduit 36 had a water content of:

1130 parts per million after 1 minute
118 parts per million after 3 minutes
66 parts per million after 10 minutes
44 parts per million after 20 minutes
29 parts per million after 30 minutes
17 parts per million after 60 minutes
10.5 parts per million after 120 minutes
5.3 parts per million after 180 minutes
4 parts per million after 240 minutes
2.2 parts per million after 300 minutes
<3 parts per million for duration of test Although the above-described invention has been described with a certain degree of particularity, it will be understood that numerous minor modifications and changes can be made therein without departing from the spirit of the invention as hereinafter claimed. For example, if the space inside vessel 33 is enlarged such that its volume equals the combined volume of space inside vessel 33 and in chamber 35 then chamber 35 and check valve 39 can be eliminated without affecting the separating efficiency of said apparatus.

What is claimed is:
1. An improved adsorption apparatus comprising:
  (a) an adsorbent vessel containing an adsorbent bed and adapted to receive at its feed inlet end a body of fluid feed which is passed under pressure through the bed for adsorption of components of the fluid that becomes adsorbed so that remaining unadsorbed fluid passes as fluid product to a product outlet end of the adsorbent vessel;

(b) a storage vessel adapted to receive and store the unadsorbed fluid product after its passage through the adsorbent bed then in restricted flow from the product outlet end of the adsorbent vessel;

(c) an assembly of a feed conduit for passing the body of fluid feed for adsorption under pressure into the feed inlet end of the adsorbent vessel, of a vent conduit for venting desorption fluid to lower pressure from said feed inlet end, and of valve means which permits passing of the fluid feed under pressure into said feed inlet end from the feed conduit when the vent conduit is closed and which then interrupts flow of fluid feed through the feed conduit when the vent conduit is open for venting desorption fluid under lower pressure from said inlet end of the adsorbent vessel; and (d) differential flow control means disposed at the product outlet end of the adsorbent vessel for permitting a greater volumetric flow of fluid per unit of time from said storage vessel into the product outlet end then through the adsorbent bed in the adsorbent vessel when the vent conduit is open for venting desorption fluid, than the restricted flow of the fluid product per unit of time from the adsorbent vessel into the storage vessel when the body of fluid feed under pressure is passed into the adsorbent vessel at its inlet end for said adsorption.

2. An apparatus according to claim 1, wherein the valve means in the assembly with the feed conduit and the vent conduit is a three-way valve attached to each of said conduits and to a conduit connecting with the inlet end of the adsorbent vessel.

3. An apparatus according to claim 1, wherein the differential flow control means is attached to the adsorbent vessel at its product outlet end and comprises a check valve and orifice, said check valve being adapted to permit flow of fluid from the storage vessel into the adsorbent vessel only on desorption and to permit a greater volumetric flow of fluid per unit time into adsorbent vessel from the storage vessel than is permitted to flow from the product outlet of the adsorbent vessel into the storage vessel with restricted flow through said orifice during said adsorption, said orifice permitting restricted flow of unadsorbed fluid product into the storage vessel from the adsorbent vessel during said adsorption and permitting flow of fluid from the storage vessel into the adsorbent vessel on said desorption.

4. An apparatus according to claim 1 wherein the adsorbent vessel is enclosed within the storage vessel, the valve means in the assembly with the said feed conduit and the vent conduit is attached to each of said conduits and to a conduit mounted in and extending into the storage vessel for connecting with the inlet of the adsorbent vessel, and the differential flow control means is mounted on the product outlet end of the adsorbent vessel.

5. An improved adsorption apparatus comprising:
(a) a storage vessel;
(b) an adsorbent vessel having a fluid feed inlet end and fluid product outlet end terminating within a storage space between the storage vessel and the adsorbent vessel and being attached to the storage vessel at said feed inlet end;
(c) a differential flow control means attached to said product outlet end for permitting a greater volumetric flow of fluid product per unit of time from the storage space into the adsorbent vessel when the fluid is vented through the feed inlet end of the adsorbent vessel under lowered pressure than the volumetric flow of fluid product in restricted flow from the adsorbent vessel at higher pressure into the storage vessel; and
(d) a fluid flow control means connected with the feed inlet end of the adsorbent vessel for passing fluid feed under pressure into said adsorbent vessel at its feed inlet end when fluid flows through said adsorbent vessel to the product outlet end then flows through said differential flow control means at a restricted flow rate into the storage space, for interrupting flow of fluid feed into the adsorbent vessel while venting fluid under lowered pressure from the adsorbent vessel at its feed inlet end to outside the storage vessel at a higher rate than the restricted flow rate of fluid that flows from the adsorbent vessel into the storage space.

6. An apparatus according to claim 5, wherein the fluid flow control means for passing fluid feed into the adsorbent vessel, interrupting flow of fluid feed, and venting fluid therefrom at said inlet end is a three-way valve.

7. An apparatus according to claim 6, wherein said three-way valve is pneumatically operated to interrupt the flow of the fluid feed into the adsorbent vessel while venting fluid from the adsorbent vessel.

8. An apparatus according to claim 6, wherein said three-way valve is manually operated.

9. An apparatus according to claim 6, wherein said three-way valve is pneumatically operated in response to pressure variations of stored fluid product within the storage space.

10. An apparatus according to claim 6, wherein said storage vessel is enclosed within a casing spaced from the storage vessel to form a surge chamber, and said surge chamber is connected by a conduit to the storage space to receive fluid product under pressure from said storage space.

References Cited by the Examiner
UNITED STATES PATENTS

| | | | |
|---|---|---|---|
| 2,823,758 | 2/1958 | Asker | 55—179 X |
| 2,955,673 | 10/1960 | Kennedy et al. | 55—62 X |
| 3,080,693 | 3/1963 | Glass et al. | 55—62 X |
| 3,147,095 | 9/1964 | Kanuch | 55—62 |
| 3,182,435 | 5/1965 | Axt | 55—62 X |

REUBEN FRIEDMAN, *Primary Examiner.*

J. ADEE, *Assistant Examiner.*